United States Patent [19]

Umeki et al.

[11] 4,363,831
[45] Dec. 14, 1982

[54] PROCESS FOR PRODUCING MAGNETIC POWDER HAVING HIGH COERCIVE FORCE

[75] Inventors: Shinji Umeki; Kazuo Takada, both of Tokyo, Japan

[73] Assignee: TDK Electronics Co., Ltd., Tokyo, Japan

[21] Appl. No.: 190,958

[22] Filed: Sep. 26, 1980

[30] Foreign Application Priority Data

Oct. 15, 1979 [JP] Japan ................................. 54-131839

[51] Int. Cl.$^3$ ............................................. B05D 5/12
[52] U.S. Cl. ..................................... 427/127; 427/128; 427/130; 427/214; 427/215; 427/343; 427/380
[58] Field of Search ................................. 427/128–132, 427/48, 214, 215, 343, 380; 428/900; 252/62.54

[56] References Cited

U.S. PATENT DOCUMENTS 4,125,474 11/1978 Dezawa et al. ................. 427/127 X Primary Examiner—Bernard D. Pianalto
Attorney, Agent, or Firm—Oblon, Fisher, Spivak, McClelland & Maier

[57] ABSTRACT

A magnetic iron oxide powder which has high coercive force and stable magnetic characteristics is produced by forming a surface layer of the magnetic iron oxide powder which comprises a cobalt compound as a main component. The magnetic iron oxide powder is treated with an aqueous solution of a cobalt ion for two times or more to form at least two surfaces comprising the cobalt compound.

1 Claim, No Drawings

PROCESS FOR PRODUCING MAGNETIC POWDER HAVING HIGH COERCIVE FORCE

BACKGROUND OF THE INVENTION

1. Field Of The Invention:

The present invention relates to a process for producing a magnetic iron oxide powder having high coercive force which is mainly used for a magnetic recording medium.

2. Description Of The Prior Art:

A magnetic recording medium is usually prepared by coating a magnetic powder composition of a mixture of a magnetic powder and a resin binder on a substrate such as a resin film.

Recently, it has been required to increase the coercive force depending upon the increase of uses of such magnetic recording media. Such high coercive force is required for the high density recording for a video-tape, a computer taper and also cassette tape recording at slow speed. In the principle of the magnetic recording, an attenuation of output in the short-wave region is lower depending upon higher coercive force of a magnetic recording medium. Therefore, higher coercive force is suitable for the high density recording. Various manners for increasing the coercive force of the magnetic powder used for magnetic recording media have been proposed.

One of the inventors disclosed the magnetic powder having high coercive force which imparts excellent characteristics when it is used for magnetic recording media, in International Applied Magnetic Society held in 1978. In accordance with the process for producing such magnetic powder, the conventional magnetic iron oxide powder ($\gamma$-$Fe_2O_3$ etc.) is dispersed into an aqueous solution of a cobalt ion and then, a strong alkaline aqueous solution is added to the suspension to give pH of higher than 12, and the suspension is heated at about 100° C. for several hours and then, the powder is washed with water and filtered and dried. The resulting magnetic iron oxide powder had a coercive force of 550 to 570 Oe and a stable coercive force in variation of temperature. Thus, when the magnetic iron oxide powder is used for magnetic recording media, it is suitable for the high density recording and also it imparts excellent printing effect and excellent erasing property and also excellent durability in the repeated uses and excellent storage stability.

The inventors have further studied improvements of preparation of such magnetic iron oxide powder and have obtained the magnetic iron oxide powder having higher coercive force than that of the conventional magnetic powder.

SUMMARY OF THE INVENTION

It is an object of the present invention to provide an improved process for producing a magnetic iron oxide powder which has high coercive force and stable magnetic characteristics.

It is another object of the present invention to produce a magnetic iron oxide which has higher coercive force than that of the product with the same amount of the cobalt ion.

The foregoing and other objects of the present invention have been attained by producing a magnetic iron oxide powder which has high coercive force and stable magnetic characteristic by forming a surface layer of the magnetic iron oxide powder, which comprises a cobalt compound as a main component wherein said magnetic iron oxide powder is treated with an aqueous solution of a cobalt ion for two times or more to form at least two surface layers comprising the cobalt compound.

DETAILED DESCRIPTION OF THE PREFERRED EMBODIMENTS

In accordance with the improved process of the present invention, the coercive force of the magnetic powder is further increased.

In accordance with the present invention, the coercive force of the magnetic iron oxide is further improved for about 30 to 40 Oe by forming two surface layers comprising a cobalt compound as a main component by repeating the step of forming the surface layer by using the magnetic iron oxide powder obtained by the former process or the conventional process.

The magnetic iron oxide powder which has high coercive force and stable magnetic characteristics is produced by repeatedly forming the surface layer comprising a cobalt compound as a main component for two or more times.

It is indispensable to repeat the reaction for forming the surface layer of the magnetic iron oxide powder comprising a cobalt compound as a main component for two or more times. The aqueous solution of a cobalt ion is added and reacted in two steps. The aqueous solution of a cobalt ion is not added at once, but is added for two or more times. Even though a total amount of the aqueous solution of a cobalt ion is the same, if it is added for two or more times, higher coercive force is imparted.

The formation of two or more surface layers comprising a cobalt compound by two or more reactions is especially preferable. The cobalt ion is converted into cobalt hydroxide by reacting with a base and cobalt hydroxide is further converted into cobalt oxide by heating.

The present invention will be illustrated by certain examples and references which are provided for purposes of illustration only and are not intended to be limiting the invention.

EXAMPLE 1

Into 1 liter of water admixed with 5 ml. of 2N aqueous solution of sodium hydroxide, 100 g. of an acicular $\gamma$-$Fe_2O_3$ having an average length of 0.4$\mu$ (coercive force of 390 Oe) was dispersed to prepare a dispersion having pH of 8.0. Then, 50 ml. of 1M aqueous solution of cobalt sulfate was added to the dispersion. The mixture was throughly mixed and then 200 ml. of 6N aqueous solution of NaOH was added and the mixture was thoroughly mixed and heated in the boiling condition for 4 hours. After cooling the mixture, the suspension was washed with water to give a supernatant having pH of 8.0. The suspension was diluted with water to be 1 liter. Then, 50 ml. of 1M aqueous solution of cobalt sulfate was added and the mixture was thoroughly stirred and then 200 ml. of 6N aqueous solution of sodium hydroxide was added and the mixture was thoroughly mixed and heated in the boiling condition for 4 hours. After cooling the mixture, it was washed with water and filtered and dried.

The resulting magnetic iron oxide powder had magnetic characteristics of a coercive force of 631 Oe and a saturation magnetic moment per unit weight of 71.0 emu/g. and a cobalt content of 5.87 wt. %.

REFERENCE 1

In accordance with the process of Example 1 except that the second reaction to add the second aqueous solution of cobalt sulfate was eliminated, a reaction, a filtration and a drying were carried out.

The resulting magnetic iron oxide powder had magnetic characteristics of a coercive force of 596 Oe and a saturation magnetic moment per unit weight of 72.3 emu/g. and a cobalt content of 2.9 wt. %.

In a comparison of Example 1 with Reference 1, when the reaction for forming the cobalt compound as the main component was repeated for two times, the coercive force is increased from 596 Oe to 631 Oe.

REFERENCE 2

In accordance with the process of Reference 1 except adding 100 ml. of 1M aqueous solution of cobalt sulfate (corresponding to the amount for two additions in Example 1), the acicular $\gamma$-Fe$_2$O$_3$ was treated.

The resulting magnetic iron oxide powder had magnetic characteristics of a coercive force of 607 Oe and a saturation magnetic moment per unit weight of 70.8 emu/g. and a cobalt content of 5.9 wt. %.

In a comparison of Reference 2 with Reference 1, the coercive force was higher only by 11 Oe than that of Reference 1. Even though the total amount of the cobalt component was the same in Reference 2 compared to Example 1, when the cobalt component was added separately in two steps, for the reaction, the coercive force was higher by 24 Oe as shown in Example 1.

We claim:

1. A process for producing a magnetic iron oxide powder with at least two surface layers, each layer comprising a cobalt compound, which comprises forming on $\gamma$-Fe$_2$O$_3$ powder a first surface layer by treating said $\gamma$-Fe$_2$O$_3$ powder with an aqueous solution of cobalt sulfate, subjecting the resultant single-layered product to an extended heating period in boiling aqueous alkali solution, forming on said single-layered product a second surface layer by treating said single-layered product with an aqueous solution of cobalt sulfate, subjecting the resultant twice-layered product to an extended heating period in boiling aqueous alkali solution, and recovering the at least twice-layered product.

* * * * *